(12) United States Patent
Earle et al.

(10) Patent No.: US 9,208,010 B2
(45) Date of Patent: Dec. 8, 2015

(54) FAILURE INTERVAL DETERMINATION

(71) Applicant: International Business Machines Corporation, Armonk, NY (US)

(72) Inventors: Vanessa R Earle, Tucson, AZ (US); Gerard N Kimbuende, Houston, TX (US); John M. Tarby, Sherman, CT (US)

(73) Assignee: International Business Machines Corporation, Armonk, NY (US)

(*) Notice: Subject to any disclaimer, the term of this patent is extended or adjusted under 35 U.S.C. 154(b) by 224 days.

(21) Appl. No.: 13/932,931

(22) Filed: Jul. 1, 2013

(65) Prior Publication Data

US 2015/0006964 A1  Jan. 1, 2015

(51) Int. Cl.
G06F 11/00 (2006.01)
G06F 11/07 (2006.01)

(52) U.S. Cl.
CPC .................. *G06F 11/0757* (2013.01)

(58) Field of Classification Search
CPC  G06F 11/0754; G06F 11/0757; G06F 11/076
See application file for complete search history.

(56) References Cited

U.S. PATENT DOCUMENTS

| 6,421,723 | B1* | 7/2002 | Tawil | 709/224 |
| 6,704,800 | B1* | 3/2004 | Lee et al. | 719/313 |
| 6,898,664 | B2* | 5/2005 | Matthews et al. | 711/112 |
| 6,952,734 | B1* | 10/2005 | Gunlock et al. | 709/227 |
| 7,779,418 | B2* | 8/2010 | Surlaker et al. | 719/314 |
| 7,925,805 | B2* | 4/2011 | Shin et al. | 710/56 |
| 7,934,027 | B2* | 4/2011 | Cooke et al. | 710/54 |
| 2009/0193108 | A1* | 7/2009 | Shin et al. | 709/223 |
| 2009/0193121 | A1* | 7/2009 | Shin | 709/225 |
| 2010/0037223 | A1* | 2/2010 | Yorimitsu | 718/100 |
| 2011/0119679 | A1* | 5/2011 | Muppirala et al. | 718/105 |

* cited by examiner

*Primary Examiner* — Joseph Kudirka

(74) *Attorney, Agent, or Firm* — Kunzler Law Group

(57) ABSTRACT

For failure interval determination, a determination module determines a failure interval for transactions in a transaction queue based on a number of processed transactions. A transaction timeout module fails a first transaction in response to the first transaction not processing within the failure interval.

17 Claims, 9 Drawing Sheets

FAILURE INTERVAL DETERMINATION

FIELD

The subject matter disclosed herein relates to failure intervals and more particularly relates to failure interval determination.

BACKGROUND

Description of the Related Art

Enterprise data processing systems may process large numbers of transactions. Some systems require a transaction to be processed within a time interval or the transaction is failed to assure timely transaction completion.

BRIEF SUMMARY

An apparatus for failure interval determination is disclosed. The apparatus includes a determination module and a transaction timeout module. The determination module determines a failure interval for transactions in a transaction queue based on a number of processed transactions. The transaction timeout module fails a first transaction in response to the first transaction not processing within the failure interval. A method and a computer program product also perform the functions of the apparatus.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
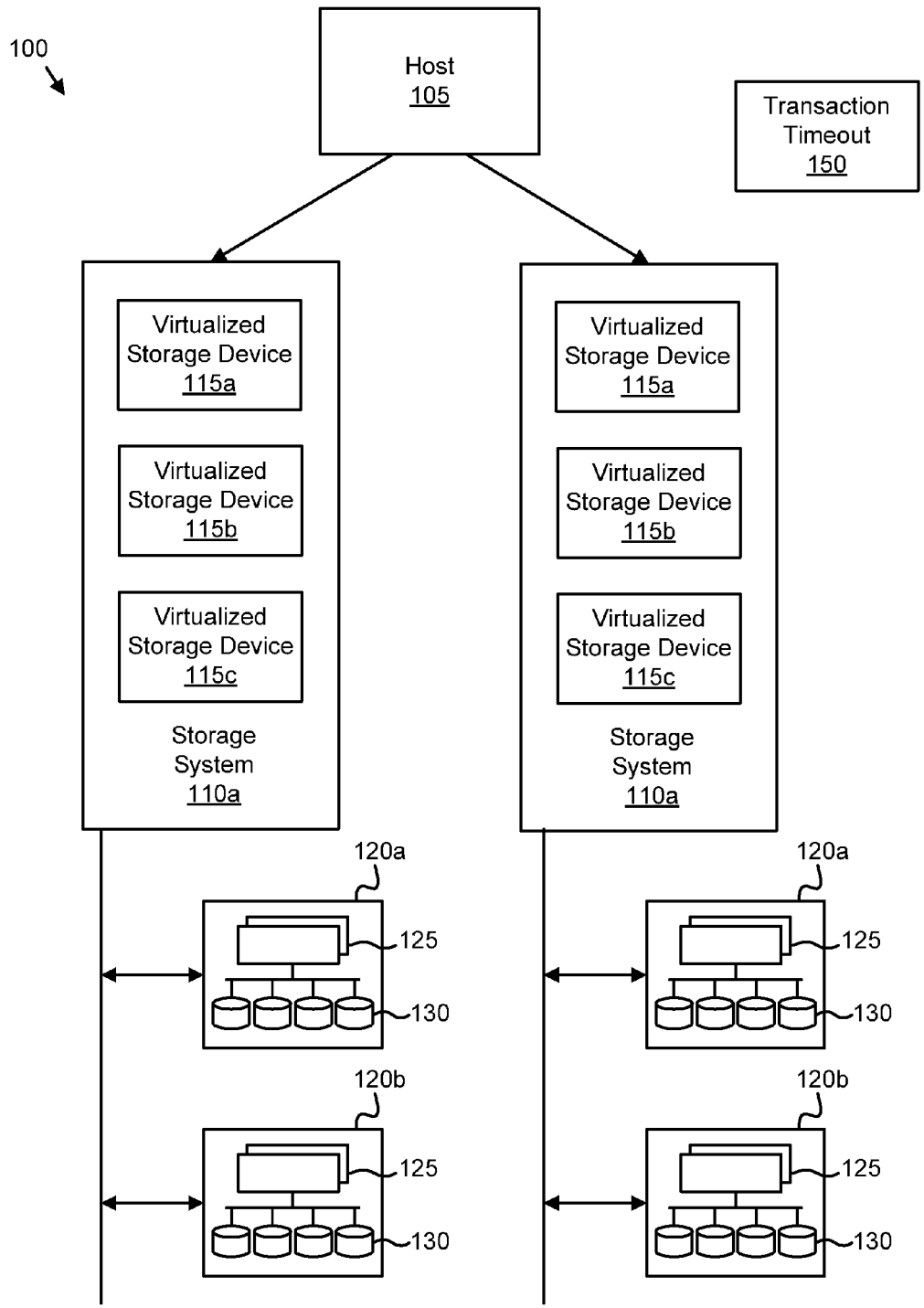
FIG. 1 is a schematic block diagram illustrating one embodiment of a transaction processing system.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1 is a schematic block diagram illustrating one embodiment of a transaction processing system 100. The system 100 may be embodied in an enterprise data processing system. The system 100 includes a host 105, one or more storage systems 110, and one or more storage subsystems 120.

The storage systems 110 may each be a TS7700 Series Virtualization Engine manufactured by International Business Machines Corporation (IBM) of Armonk, N.Y. Each storage system 110 may include one or more virtualized storage devices 115. In one embodiment, the virtualized storage devices 115 each emulate one or more physical tape storage devices. Alternatively, the virtualized storage devices 115 may emulate one or more hard disk drives, one or more optical storage devices, one or more micro mechanical storage devices, or the like.

The host 105 may be an IBM Z/OS® system, z/VM system, Z/VSE™ system, and/or z/TPF system. The host 105 may communicate transactions to the storage systems 110. In one embodiment, the transactions are memory operations such as reads and writes. In a certain embodiment, the transactions are recorded in transaction logs and may be used to recover and/or undo transaction operations.

The storage systems 110 process the transactions. In one embodiment, the storage systems 110 process the transactions by performing a storage operation specified by each transaction on a virtualized storage device 115. For example, the first storage system 110a may process a transaction by writing the transaction to a first virtualized storage device 115a. Each transaction may be processed with a specified virtualized storage device 115.

In one embodiment, the storage systems 110 further process each transaction by communicating the transaction to a storage subsystem 120. Each storage subsystem 120 may be a tape library. Each storage subsystem 120 may include one or more controllers 125 and one or more storage devices 130. Storage devices 130 may be magnetic tape drives storing data to magnetic tape, hard disk drives, optical storage devices, and the like. Each transaction may be completed when processed to a storage subsystem 120.

A transaction may be stored at the host 105 until a transaction can be processed by storage subsystem 110. The transaction may be stored in at least one transaction queue as will be described hereafter. The transaction queue may be a buffer. In one embodiment, the host 105 maintains a virtualized storage device transaction queue for each virtualized storage device 115.

When the host 105 receives large numbers of transactions, a first storage system 110a may fail, and the system 100 may perform a failover from the first storage system 110a to a second storage system 110b. System reliability and performance is improved if a storage system 110 is not processing transactions, such as by issuing library commands, using critical code paths when a failover is in process and/or is imminent.

To assure that transactions are not pending during a failover from the first storage system 110a to the second storage system 110b, a transaction timeout 150 may fail a transaction that is not complete within a failure interval. The transaction timeout 150 may be embodied in the host 105. Alternatively, the transaction timeout 150 may be embodied in one or more storage systems 110. Reliability is improved when transactions that do not complete within reasonable time are failed. However, because failing a transaction requires consuming additional system resources to ultimately complete the transaction, transactions should be failed earlier when a failover is more likely and failed later when a failover is less likely. The embodiments described herein determine the failure interval such that transactions are failed earlier when a failover is more likely and failed later when a failover is less likely as will be described hereafter.

Unfortunately, failing a transaction may adversely affect the transaction processing performance of the system 100 just when the system 100 needs to process more transactions. The embodiments described herein may also maintain the transaction queue. The embodiments may detect the transaction queue exceeding a queue threshold and mitigate a failure of a transaction in response to detecting the transaction queue exceeding the queue threshold to avoid failing the transaction and slowing the processing of transactions by the system 100 as will be described hereafter.

Figure 2:
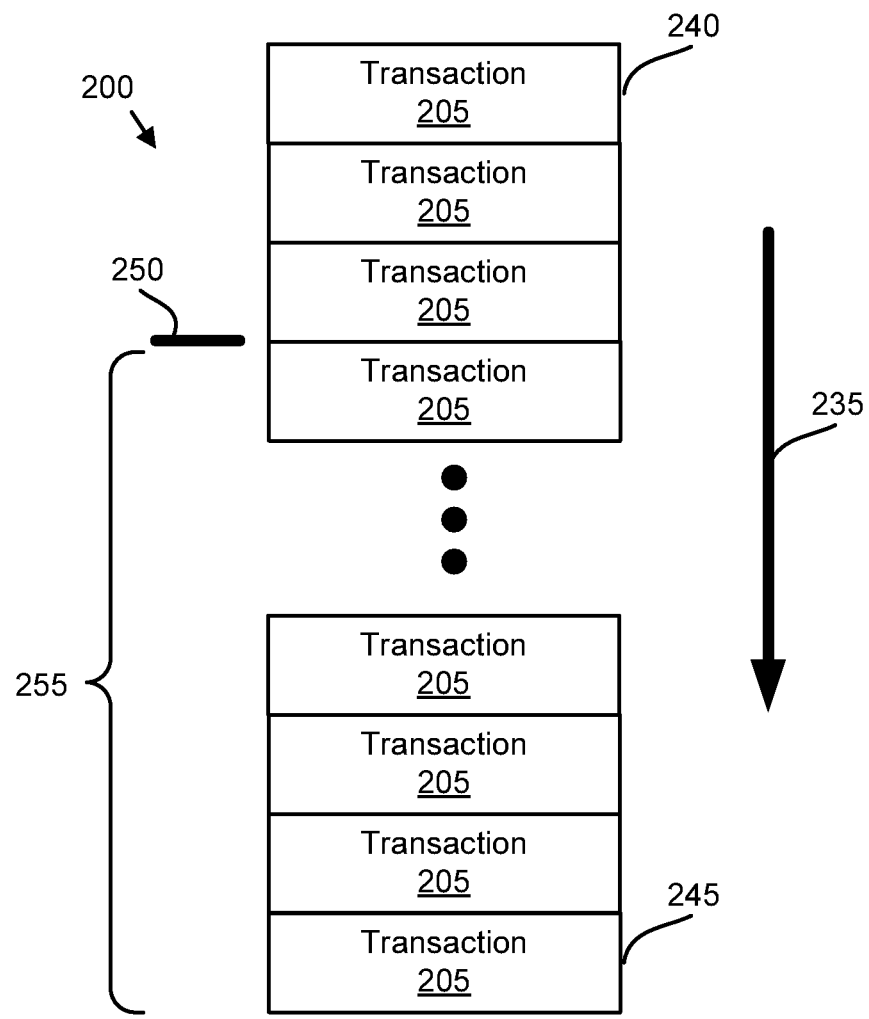
FIG. 2 is a schematic block diagram illustrating one embodiment of a transaction queue.

FIG. 2 is a schematic block diagram illustrating one embodiment of a transaction queue 200. The transaction queue 200 includes a plurality of transactions 205. The transactions 205 may be stored in a semiconductor memory with pointers maintaining an order among the transactions 205. The latest received transaction 205 is stored at a beginning 240 of the transaction queue 200. Transactions 205 remain in the queue, approaching 235 an end 245 of the transaction queue 200 until the end 245 is reached and the transaction 205 is processed. In one embodiment, each virtualized storage device 115 has at least one virtualized storage device transaction queue 200. The transaction queue 200 stores the transactions 205 prior to processing by a storage system 110. The transaction timeout 150 may fail each transaction 205 that does not complete within a failure interval.

In one embodiment, a queue threshold 250 is determined for the transaction queue 200. The queue threshold 250 may be a specified queue depth 255 of transactions 205 from the end 245 of the transaction queue 200.

Figure 3A:
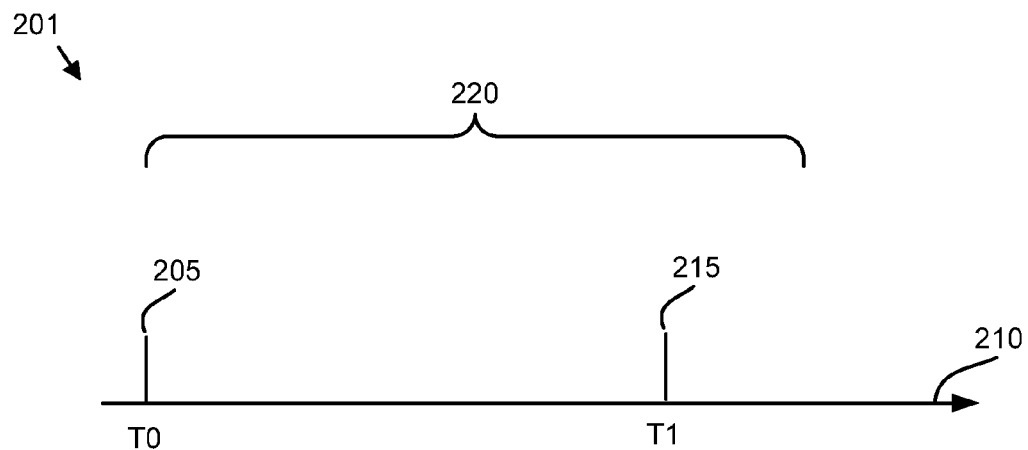
FIGS. 3A-B are drawings illustrating embodiments of failure intervals.

FIG. 3A is a drawing illustrating one embodiment of a transaction 210 completing 201 within the failure interval 220. A timeline 210 represents a forward flow of time. A transaction 205 enters the transaction queue 200 at time T0. The transaction 205 must complete before the end of the failure interval 220. In one embodiment, the failure interval 220 may to initially set to 16 seconds. Alternatively, the failure interval 220 may be initially set in the range of 5 to 20 seconds. In the depicted embodiment, the transaction completes 215 at time T1, which is within the failure interval 220.

Figure 3B:
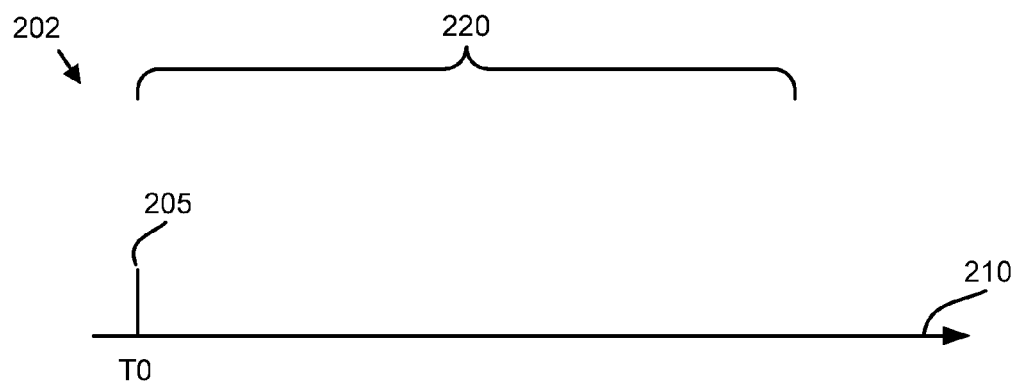

FIG. 3B is a drawing illustrating one embodiment of a transaction not completing 202 within the failure interval 220. The timeline 210 and failure interval 220 of FIG. 3A are shown. As in FIG. 3A, a transaction 205 enters the transaction queue 200 at time T0. However, the transaction 205 does not complete within the failure interval 220. As a result, the transaction timeout 150 may fail the transaction 205. The transaction timeout 150 may be a user exit function of an IBM TS7700 Series Virtualization Engine.

When the system 100 is busy and processing many transactions 205, a failover is more likely. As a result, reliability is enhanced if the failure interval 220 is shorter. However, when the system 100 is not busy and processes fewer transaction 205, failover is less likely and the transaction 205 may be safely given more time to complete. As a result, reliability and performance may be improved by increasing the failure interval 220. The embodiments described herein determine the failure interval 220 based on one or more factors including but not limited to processed transactions, system resources, system bandwidth as will be described hereafter.

Failing a transaction 205 may also increase the execution times for applications that are providing the transactions 205 to the host 105 and slow system performance. The embodiments may anticipate a failure by detecting the transaction queue 200 exceeding a queue threshold 250 so that failures of transactions 205 may be mitigated rather than failed as will be described hereafter.

Figure 4A:
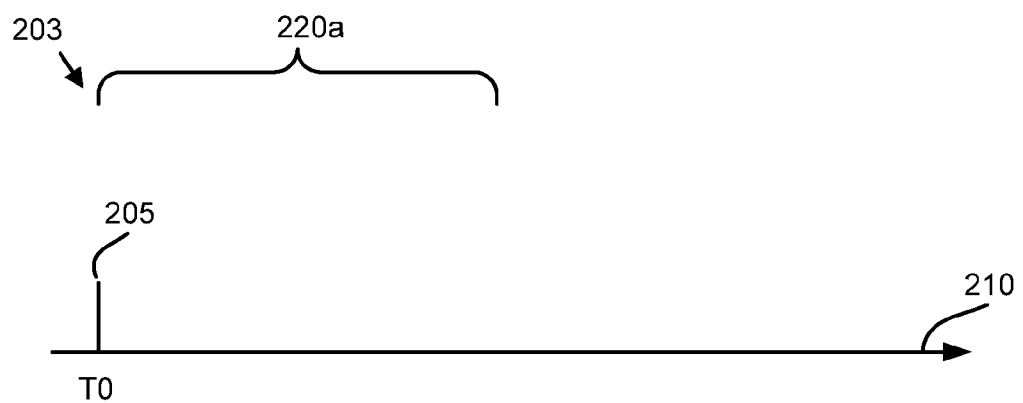
FIGS. 4A-B are drawings illustrating embodiments of failure interval determination.
Figure 4B:
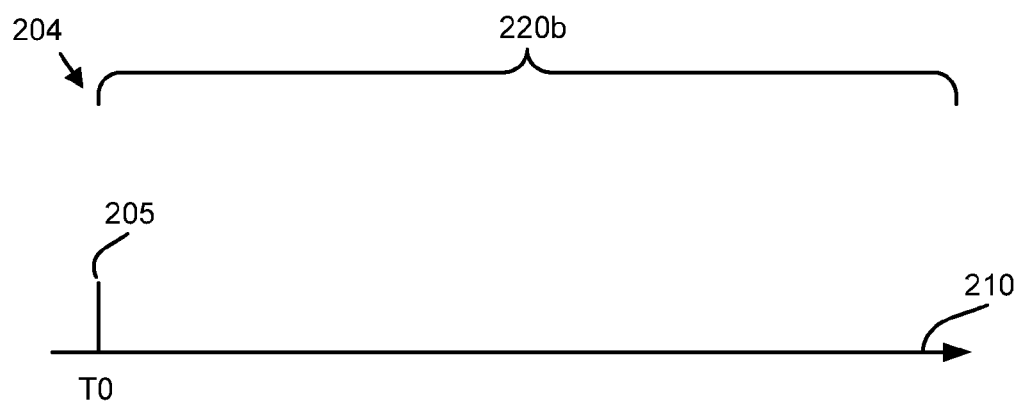

FIGS. 4A-B are drawings illustrating embodiments of failure interval determination 203, 204. FIG. 4A depicts determining 203 that a first failure interval 220a. The first failure interval 220a is shown as shorter than the initial failure interval 220 of FIGS. 3A-B. In one embodiment, the first failure interval 220a is reduced in response to the system 100 processing an increased number of transactions 205. Alternatively, the first failure interval 220a may be reduced in response to reduced system resource availability, reduced system bandwidth, and the like.

FIG. 4B depicts determining 204 a second failure interval 220b. The second failure interval 220b is shown as longer than the initial failure interval 220 of FIGS. 3A-B. In one embodiment, the second failure interval 220b is increased in response to the system 100 processing a reduced number of transactions 205. Alternatively, the second failure interval 220b may be increased in response to increased system resource availability, increased system bandwidth, and the like.

Figure 5A:
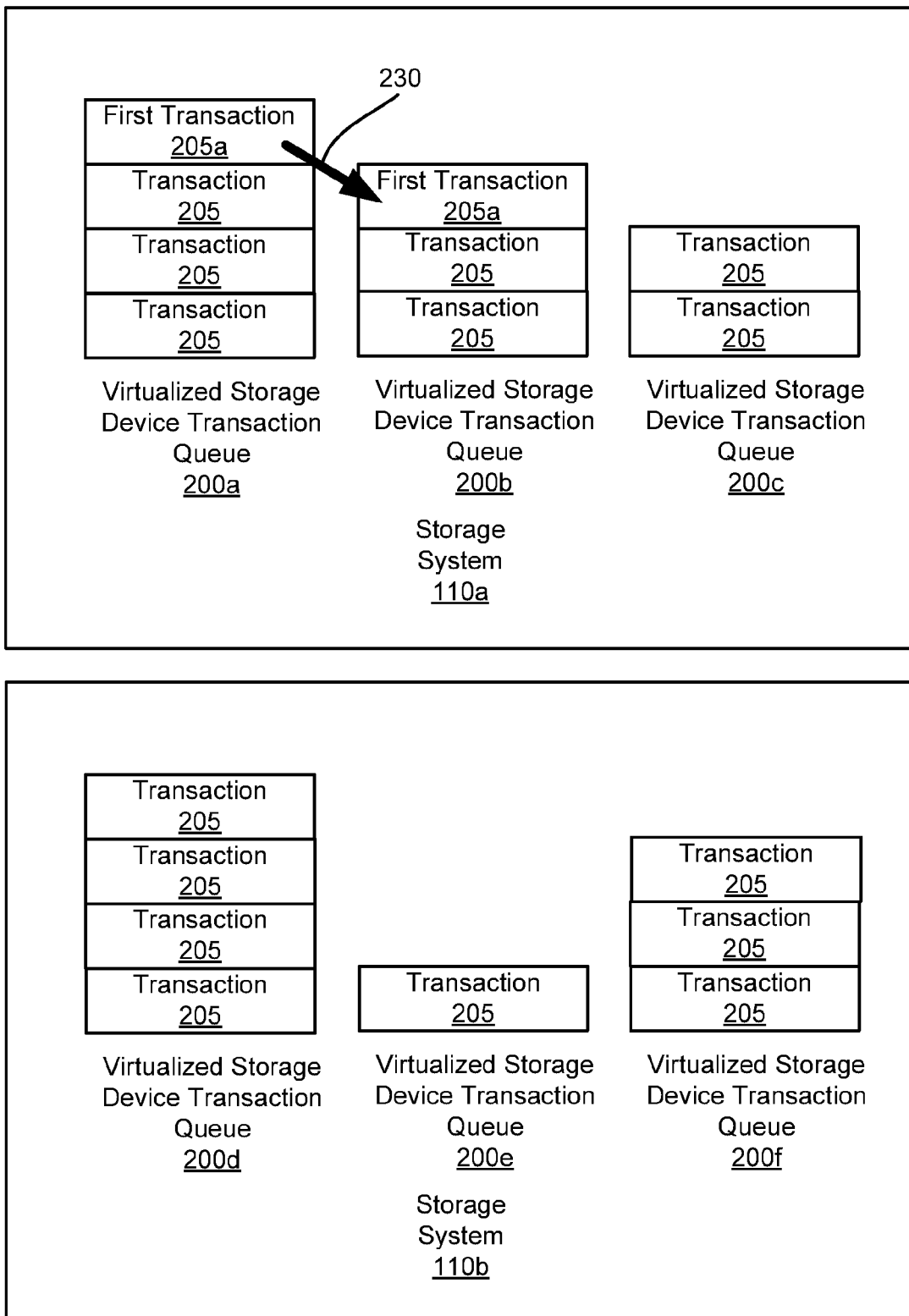
FIGS. 5A-B are schematic block diagrams illustrating embodiments of mitigating a failure of a transaction.

FIG. 5A is a schematic block diagram illustrating one embodiment of mitigating a failure of a transaction 205. Two storage systems 110 are depicted along with virtualized storage device transaction queues 200 for the virtualized storage devices 115 of the storage systems 110.

A failure of a first transaction 205a is depicted as being mitigated. In one embodiment, the mitigation comprises a user exit function of the IBM TS7700 Series Virtualization Engine. The failure of the first transaction 205a may be mitigated by reassigning 230 the first transaction 205a from a first virtualized storage device transaction queue 200a on the first storage system 110a queue to a second virtualized storage device transaction queue on the first storage system 110a. Reassigning 230 the first transaction 205a may restart the failure interval 220.

Figure 5B:
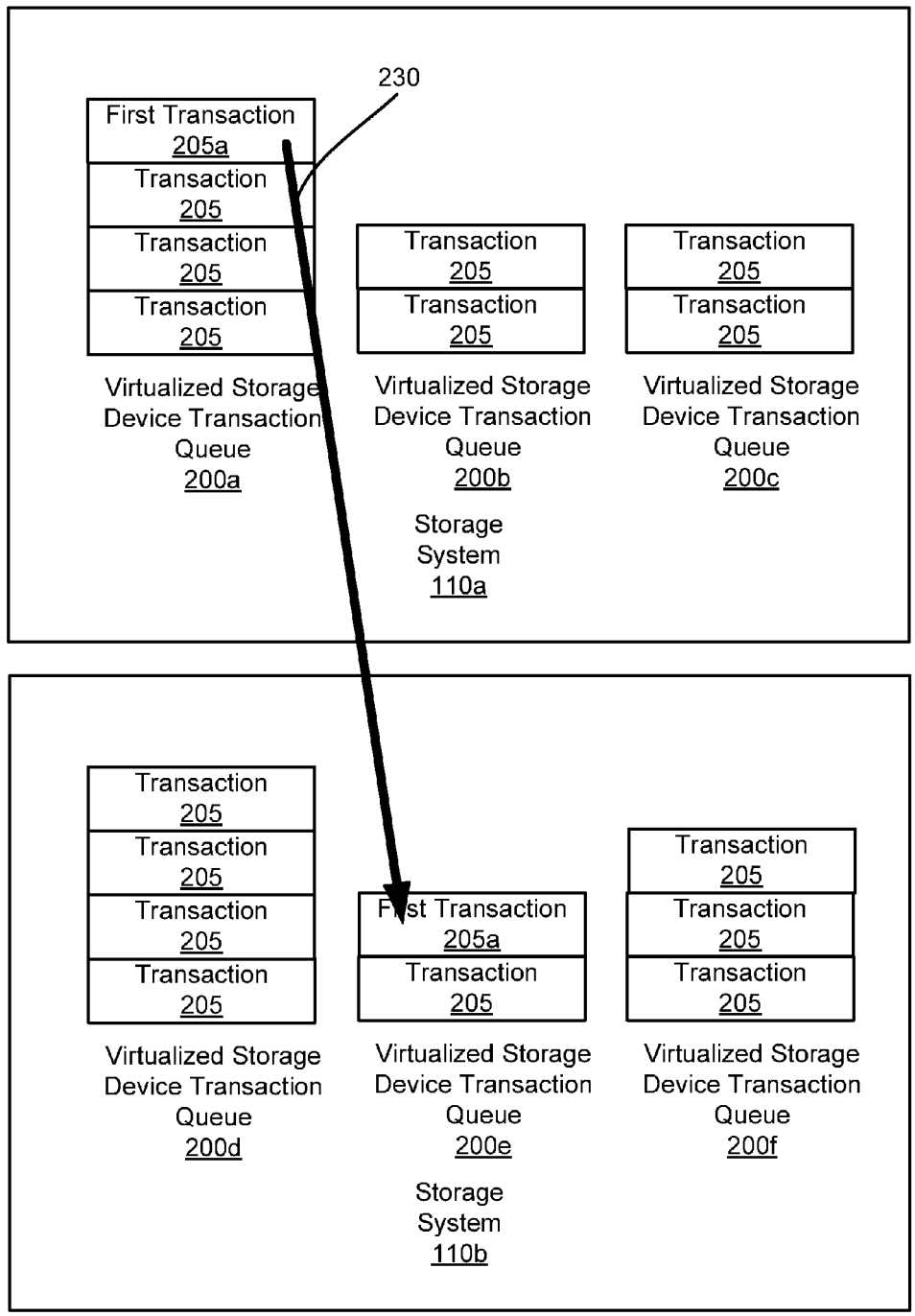

FIG. 5B is a schematic block diagram illustrating one alternate embodiment of mitigating a failure of a transaction 205. The storage systems 110 of FIG. 5 are depicted. The failure of the first transaction 205a is mitigated by reassigning 230 the first transaction 205a from the first virtualized storage device transaction queue 200a on the first storage system 110a to a fifth virtualized storage device transaction queue 200e on the second storage system 110b. Reassigning the first transaction 205a may restart the failure interval 220.

Figure 6:
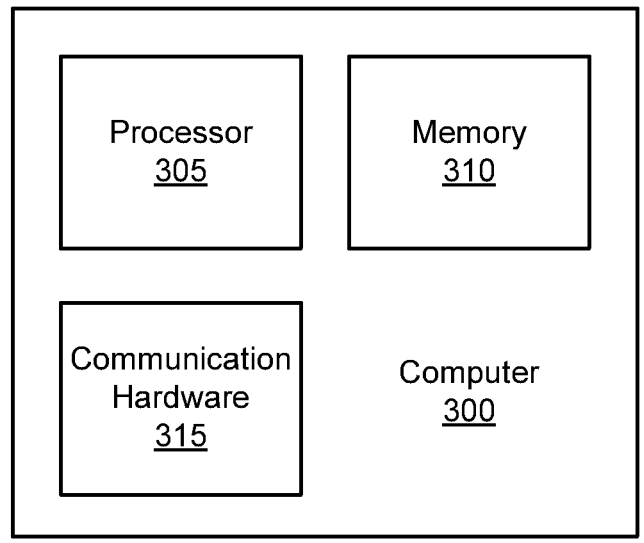
FIG. 6 is a schematic block diagram illustrating one embodiment of a computer.

FIG. 6 is a schematic block diagram illustrating one embodiment of a computer 300. The computer 300 may be embodied in the host 105. Alternatively, the computer 300 may be embodied in the host 105, the storage systems 110, the transaction timeout 150, or combinations thereof. The computer 300 includes a processor 305, a memory 310, and communication hardware 315. The memory 310 may be a computer readable storage medium such as a semiconductor storage device, a hard disk storage device, an optical storage device, a micromechanical storage device, and the like. The memory 310 may store program code. The processor 305 may execute the program code. The communication hardware 315 may communicate with other devices.

Figure 7:
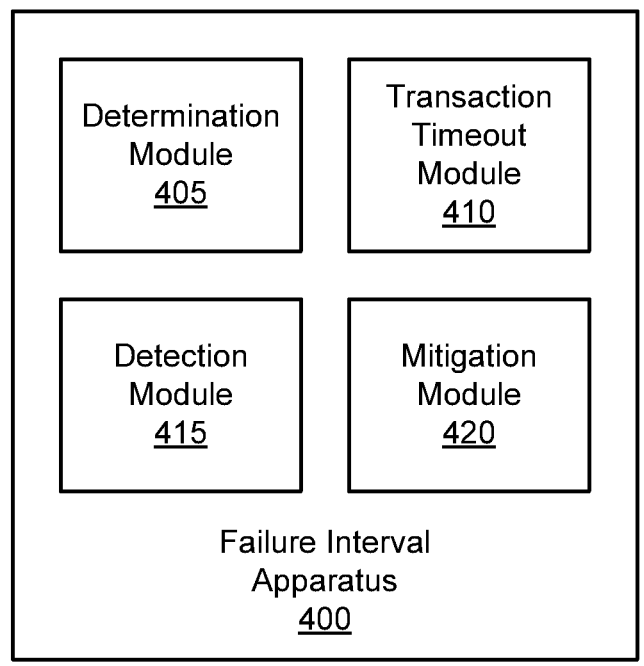
FIG. 7 is a schematic block diagram illustrating one embodiment of a failure interval apparatus.

FIG. 7 is a schematic block diagram illustrating one embodiment of a failure interval apparatus 400. The apparatus 400 may be embodied in the computer 300 of FIG. 7. The apparatus 400 includes a determination module 405, a transaction timeout module 410, a detection module 415, and a mitigation module 420. The determination module 405, transaction timeout module 410, detection module 415 and mitigation module 420 may comprise one or more of hardware and program code stored on a computer readable storage medium such as the memory 310. The transaction timeout module 410 may be embodied in the transaction timeout 150.

The determination module 405 may determine the failure interval 220 for transactions 205 in the transaction queue 200. The determination of the failure interval 220 may be based on a number of processed transactions 205. Alternatively, the determination of the failure interval 220 may be based on system resources and/or system bandwidth. The transaction timeout module 410 may fail a first transaction 205a in response to the first transaction 205a not processing with the failure interval 220.

The detection module 415 may detect the transaction queue 200 exceeding a queue threshold 250. The mitigation module may automatically mitigate a failure of the first transaction 205a in response to detecting the transaction queue 200 exceeding the queue threshold 250.

Figure 8:
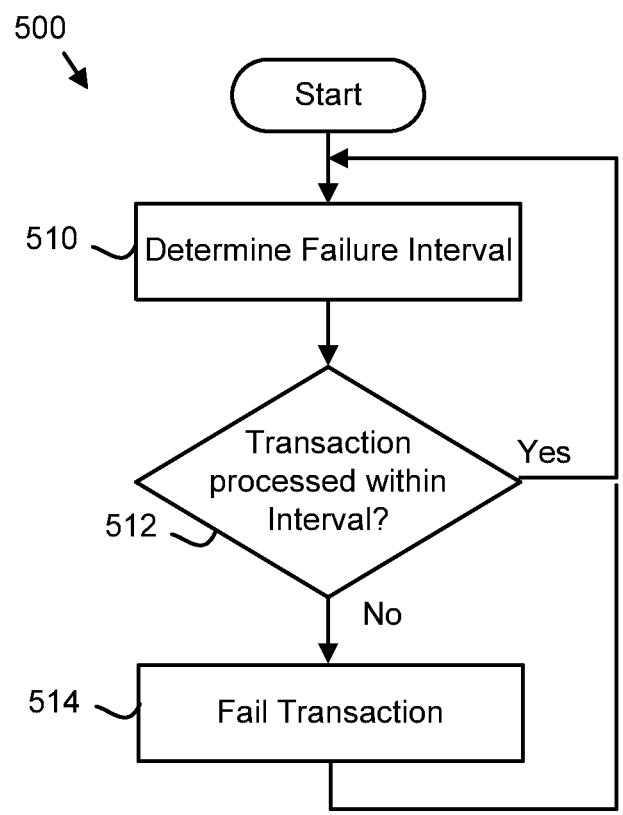
FIG. 8 is a schematic flow chart diagram illustrating one embodiment of a failure interval determination method.

FIG. 8 is a schematic flow chart diagram illustrating one embodiment of a failure interval modification method 500. The method 500 may perform the functions of the system 100 and apparatus 400. In one embodiment, the processor 305 performs the method 500. Alternatively, a computer program product comprising a computer readable storage medium such as the memory 310 stores program code. The program code is readable/executable by the processor 305 to perform the method 500.

The method 500 starts, and in one embodiment, the determination module 405 determines 510 the failure interval 220 for transactions 205 in the transaction queue 200. The failure interval 220 may be based on processed transactions 205. In one embodiment, failure interval 220 may be based on a number of processed transactions 205. In a certain embodiment, the failure interval FI 220 is calculated using Equation 1, where k is a non-zero constant and PT is a number of processed transactions. The processed transactions may be processed transactions per second, processed transactions per minute, or the like.

$$FI = k/PT \quad \text{Equation 1}$$

Alternatively, the failure interval FI 220 may be calculated using Equation 2.

$$FI = k\sqrt{PT} \quad \text{Equation 2}$$

The failure interval 220 may be based on system resources and/or system bandwidth. For example, the failure interval FI 220 may be calculated using Equation 3, where h is a non-zero constant and SR is system resources measured as a number of virtualized storage devices 115.

$$FI = h*SR \quad \text{Equation 3}$$

In one embodiment, the failure interval 220 may be calculated using Equation 4, where g is a non-zero constant and SB is system bandwidth measured as available central processor unit bandwidth.

$$FI = g*SB \quad \text{Equation 4}$$

The transaction timeout module 410 may determine 512 if the first transaction 205a processes within the failure interval 220. In one embodiment, the transaction timeout module 410 may start a timer when the first transaction 205a enters the transaction queue 200. If the timer counts down to zero before the first transaction 205a processes, the transaction timeout module 410 may determine 512 that the first transaction 205a did not processed within the failure interval 220. The transaction timeout module 410 may fail a first transaction 205a in response to the first transaction 205a not processing with the failure interval 220. Failing the first transaction 205a may abort a write or read for the first transaction 205a to a virtualized storage device 115. In addition, the first transaction 205 may be added to a transaction queue 200.

If the transaction timeout module 410 determines 512 that the first transaction 205a processes within the failure interval 220, the determination module 405 may continue to determine 510 the failure interval 220, dynamically modifying the failure interval 220.

By dynamically determining 510 the failure interval 220, the embodiments reduce the failure interval 220 when the system 100 is more active and the risk of a failover is greater. However, the embodiments may increase the failure interval 220 when the system 100 is less active and the risk of a failover is reduced. As a result, the protection provided by the failure interval 220 is dynamically modified to conform to system operation.

Figure 9:
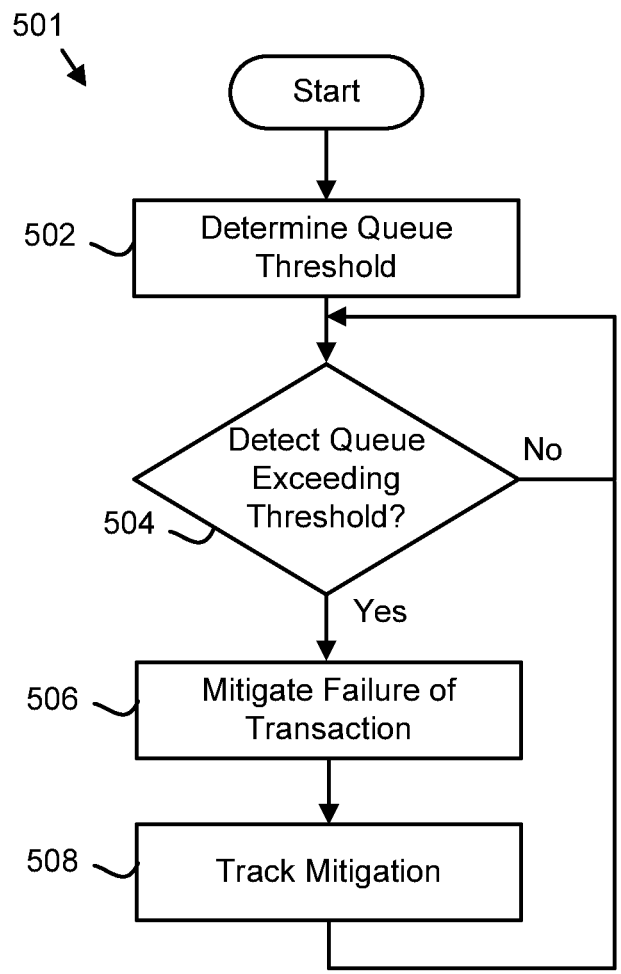
FIG. 9 is a schematic flow chart diagram illustrating one embodiment of a transaction queue maintenance method.

FIG. 9 is a schematic flow chart diagram illustrating one embodiment of a transaction queue maintenance method 501. The method 501 may perform the functions of the system 100 and apparatus 400. In one embodiment, the processor 305 performs the method 501. Alternatively, a computer program product comprising a computer readable storage medium such as the memory 310 stores program code. The program code is readable/executable by the processor 305 to perform the method 501.

The method 501 starts, and in one embodiment, the detection module 415 determines 502 the queue threshold 250. The detection module may determine 502 the queue threshold 250 to be the queue depth 255 for a previous failure. For example, if the transaction timeout 150 previously failed a transaction 205 for not completing within the failure interval 220 when the queue depth 255 was 10,602 transactions 205, the detection module 415 may determine 502 the queue threshold 250 to be 10,601 transactions 205.

In one embodiment, the detection module 415 determines 502 the queue threshold 250 to be an average of the queue depths 255 for previously failed transactions 205. The average may be a rolling weighted-average, with the queue depths 255 for more recent failed transactions 205 weighted more heavily than the queue depths 255 for later failed transactions 205. Alternatively, the detection module 415 may receive the queue threshold 250 from an administrator. In a certain embodiment, the queue threshold 250 is a function of an estimated processing throughput for the storage system 110.

In one embodiment, the queue threshold 250 is a number of transactions 205 requiring more than a completion time interval to process. The completion time interval may be in the range of 500 to 2000 milliseconds. In a certain embodiment, the completion time interval is one second.

In an alternate embodiment, the queue threshold 250 is a quantity of data for transactions 205 in the transaction queue 200. The detection module 415 may determine 502 the queue threshold 250 to be the quantity of data for transactions 205 in the transaction queue 200 for a previously failed transaction 205.

In a certain embodiment, the queue threshold 250 is a transaction capacity per threshold time interval for a virtualized storage device 115. The threshold time interval may be equivalent to the failure interval 220. The transaction capacity may be a number of transactions 205 of the virtualized storage device 115 can process during the threshold time interval.

The detection module 415 may detect 504 the transaction queue 200 exceeding the queue threshold 250. The transaction queue 200 may store transactions 205 prior to processing by a storage system 110. The storage system 110 may include the transaction timeout 150 that fails each transaction 205 that does not complete within the failure interval 220.

For example, if the queue threshold 250 is 10,601 transactions 205, and the transaction queue 205 contains 10,602 transactions 205, the detection module 415 may detect 504 the transaction queue 200 exceeding the queue threshold 250.

In an alternative embodiment, the detection module 415 detects 504 the transaction queue 200 exceeding the queue threshold 250 if the quantity of data for transactions 205 in the transaction queue 200 exceeds the queue threshold 250 where the queue threshold 250 specifies a data quantity.

The mitigation module 420 may mitigate 506 a failure of the first transaction 205a in response to detecting 504 the transaction queue 200 exceeding the queue threshold 250 and the method 501 may loop to detect 504 the transaction queue 200 exceeding the queue threshold 250. In one embodiment, the first transaction 205a is a transaction 205 most recently added to the beginning 240 of the transaction queue 200. Alternatively, the first transaction 205a is a next transaction 205 after the queue threshold 250.

In one embodiment, mitigating 506 the failure of the first transaction 205a comprises determining if the storage system 110 corresponding to the transaction queue 200 can wait for the transaction 205 to complete. If the mitigation module 420 determines that the storage system 110 can complete the transaction 205, the mitigation module 420 may mitigate 506 the failure of the first transaction 205a by allowing the first transaction 205a to complete. If the mitigation module 420 determines that the storage system 110 cannot complete the first transaction 205a, the mitigation module 420 may mitigate 506 the failure of the first transaction 205a by aborting and reassigning the first transaction 205a.

In one embodiment, mitigating 506 the failure of the first transaction 205a comprises reassigning 230 the first transaction 205a from a first virtualized storage device transaction queue 200a to a second virtualized storage device transaction queue 200b. Reassigning 230 the first transaction 205a may restart the failure interval 220. In an alternative embodiment, mitigating 506 the failure of the first transaction 205a comprises reassigning 230 the first transaction 205a from a first storage system 110a to a second storage system 110b. In a certain embodiment, reassigning 230 the first transaction 205a from the first storage system 110a to the second storage system 210b comprises reassigning 230 the first transaction 205a from a first virtualized storage device transaction queue 200a for the first storage system 110a to a second virtualized storage device transaction queue 200b for the second storage system 110b.

The mitigation module 420 may mitigate 506 the failure of the first transaction 205a by extending the failure interval 220. The mitigation module 420 may extend the failure interval 220 for the first transaction 205a. Alternatively, the mitigation module 420 may extend the failure interval 220 for all transactions 205. For example, the mitigation module 420 may double the failure interval 220 for the first transaction 205a.

The mitigation module 420 may further track 508 the mitigation for the first transaction 205a. In one embodiment, the mitigation module 420 resets the timer for the first transaction 205a. In addition, the mitigation module 420 may record a log entry detailing the mitigation of the first transaction 205a.

By anticipating a transaction failure through detecting 504 the transaction queue 200 exceeding the queue threshold 250 and mitigating 506 a failure of a first transaction 205a in response to detecting 504 the transaction queue 200 exceeding the queue threshold 250, the embodiments avoid failing the first transaction 205a and avoid reducing the performance of the system 100. As a result, the processing of transactions 205 by the system 100 is more reliable, even when processing large numbers of transactions 205.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a determination module determining a failure interval for transactions in a transaction queue based on a number of processed transactions, wherein the transaction queue stores transactions prior to processing by a first storage system and the failure interval FI determined as FI = k/PT where k is a non-zero constant and PT is the number of processed transactions; and
a transaction timeout module failing a first transaction in response to the first transaction not completing processing within the failure interval, wherein at least a portion of the determination module and the transaction timeout module comprise one or more of hardware and executable code, the executable code stored on one or more computer readable storage media.

2. The apparatus of claim 1, further comprising:
a detection module detecting the transaction queue exceeding a queue threshold; and
a mitigation module automatically mitigating a failure of the first transaction in response to detecting the transaction queue exceeding the queue threshold, wherein at least a portion of the detection module and the mitigation module comprise one or more of the hardware and the executable code.

3. The apparatus of claim 2, wherein the queue threshold is selected from the group consisting of a number of the transactions in the transaction queue, a quantity of data for the transactions in the transaction queue, and a transaction capacity per threshold time interval.

4. A method for transaction queue maintenance comprising:
   determining, by use of a processor, a failure interval for transactions in a transaction queue based on a number of processed transactions, wherein the transaction queue stores transactions prior to processing by a first storage system and the failure interval FI is determined as FI = k/PT where k is a non-zero constant and PT is the number of processed transactions; and
   failing a first transaction in response to the first transaction not completing processing within the failure interval.

5. The method of claim 4, further comprising:
   detecting the transaction queue exceeding a queue threshold; and
   automatically mitigating a failure of the first transaction in response to detecting the transaction queue exceeding the queue threshold.

6. The method of claim 5, wherein the first storage system comprises a plurality of virtualized storage devices and each transaction is processed with a specified virtualized storage device.

7. The method of claim 6, wherein mitigating the failure of the first transaction comprises reassigning the first transaction from a first virtualized storage device transaction queue to a second virtualized storage device transaction queue.

8. The method of claim 7, wherein reassigning the first transaction restarts the failure interval.

9. The method of claim 5, wherein mitigating the failure of the first transaction comprises reassigning the first transaction from the first storage system to a second storage system.

10. The method of claim 5, wherein the queue threshold is selected from the group consisting of a number of the transactions in the transaction queue, a quantity of data for the transactions in the transaction queue, and a transaction capacity per threshold time interval.

11. The method of claim 5, further comprising tracking the mitigation.

12. The method of claim 5, wherein the automatic mitigation of the failure of the first transaction is in response to detecting the transaction queue exceeding the queue threshold and in response to a mitigation setting.

13. The method of claim 5, further comprising determining the queue threshold.

14. The method of claim 13, wherein the queue threshold is determined to be a queue depth for previous failure.

15. A computer program product for transaction queue maintenance, the computer program product comprising a computer readable storage medium having program code embodied therein, the program code readable/executable by a processor to:
   determine a failure interval for transactions in a transaction queue based on a number of processed transactions, wherein the transaction queue stores transactions prior to processing by a first storage system and the failure interval FI is determined as FI =k/PT where k is a non-zero constant and PT is the number of processed transactions; and
   fail a first transaction in response to the first transaction not completing processing within the failure interval.

16. The computer program product of claim 15, the program code further readable/executable by the processor to:
   detect the transaction queue exceeding a queue threshold; and
   automatically mitigate a failure of the first transaction in response to detecting the transaction queue exceeding the queue threshold.

17. The computer program product of claim 16, wherein the queue threshold is selected from the group consisting of a number of the transactions in the transaction queue, a quantity of data for the transactions in the transaction queue, and a transaction capacity per threshold time interval.

\* \* \* \* \*